United States Patent
Chew et al.

(10) Patent No.: US 8,887,844 B2
(45) Date of Patent: Nov. 18, 2014

(54) VEHICLE HAVING AN ELECTRIC DRIVE DEVICE

(75) Inventors: Guan Chew, Bietigheim-Bissingen (DE); Miroslaw Oslislok, Leonberg (DE); Hartmut Chodura, Stuttgart (DE); Patrik Gisch, Heimsheim (DE); Steffen Maurer, Stuttgart (DE); Ralf Bauer, Neckarsulm (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 271 days.

(21) Appl. No.: 13/014,908

(22) Filed: Jan. 27, 2011

(65) Prior Publication Data

US 2011/0192659 A1     Aug. 11, 2011

(30) Foreign Application Priority Data

Feb. 5, 2010   (DE) .......................... 10 2010 007 633

(51) Int. Cl.
| | |
|---|---|
| *B60K 11/00* | (2006.01) |
| *H01M 10/63* | (2014.01) |
| *H01M 10/6557* | (2014.01) |
| *B60L 11/18* | (2006.01) |
| *H01M 10/613* | (2014.01) |
| *H01M 10/6563* | (2014.01) |

(52) U.S. Cl.
CPC .......... *H01M 10/5059* (2013.01); *Y02T 10/705* (2013.01); *Y02E 60/12* (2013.01); *H01M 10/502* (2013.01); *Y02T 10/7005* (2013.01); *B60L 11/1874* (2013.01); *H01M 10/5004* (2013.01); *B60L 11/1879* (2013.01); *H01M 10/5067* (2013.01); *Y02T 10/70* (2013.01)

USPC .......................... 180/68.1; 180/68.2; 180/65.1

(58) Field of Classification Search
USPC .............................. 180/68.1, 68.2, 68.5, 65.1
See application file for complete search history.

(56) References Cited

U.S. PATENT DOCUMENTS

| | | | | |
|---|---|---|---|---|
| 2,199,317 | A * | 4/1940 | Klavik .......................... | 180/68.1 |
| 2,353,266 | A * | 7/1944 | Reid ............................. | 180/68.1 |
| 2,390,218 | A * | 12/1945 | Lamb et al. ................... | 180/68.1 |
| 4,690,204 | A * | 9/1987 | Reichel et al. ................. | 165/44 |
| 5,490,572 | A * | 2/1996 | Tajiri et al. .................... | 180/65.1 |
| 5,558,949 | A * | 9/1996 | Iwatsuki et al. ................ | 429/99 |
| 5,937,664 | A * | 8/1999 | Matsuno et al. ............. | 62/259.2 |
| 6,220,383 | B1 * | 4/2001 | Muraki et al. ................ | 180/68.5 |
| 6,541,151 | B2 * | 4/2003 | Minamiura et al. ........... | 429/98 |
| 6,547,020 | B2 * | 4/2003 | Maus et al. .................. | 180/68.5 |

(Continued)

FOREIGN PATENT DOCUMENTS

| | | |
|---|---|---|
| DE | 10 2004 025 831 A1 | 12/2005 |
| DE | 10 2009 016 577 A1 | 11/2009 |
| WO | WO 2009/062710 A1 | 5/2009 |

*Primary Examiner* — Hau Phan
(74) *Attorney, Agent, or Firm* — RatnerPrestia

(57) ABSTRACT

A vehicle having an electric drive device and an energy storage device which is arranged in a housing is disclosed. The energy storage device is formed from a plurality of cells. The housing includes a plurality of partitioning devices, with the result that at least one partitioning device is positioned between two cells. The housing of the energy storage device is connected both to a cooling air intake duct, having an inlet opening, and to a cooling air outflow duct, having an outlet opening. At least one partitioning device is configured in such a way that a plurality of cooling ducts are formed between the cells, and cooling air can flow through the cooling ducts in order to cool the energy storage device.

10 Claims, 3 Drawing Sheets

(56) References Cited

U.S. PATENT DOCUMENTS

| | | | |
|---|---|---|---|
| 6,662,891 B2* | 12/2003 | Misu et al. | 180/68.1 |
| 7,163,073 B2* | 1/2007 | Schmid et al. | 180/68.3 |
| 7,353,900 B2* | 4/2008 | Abe et al. | 180/68.5 |
| 7,531,269 B2* | 5/2009 | Wegner | 429/120 |
| 7,607,501 B2* | 10/2009 | Smith et al. | 180/68.1 |
| 7,654,351 B2* | 2/2010 | Koike et al. | 180/68.5 |
| 7,688,582 B2* | 3/2010 | Fukazu et al. | 180/68.1 |
| 7,823,671 B2* | 11/2010 | Inoue et al. | 180/68.4 |
| 7,823,672 B2* | 11/2010 | Watanabe et al. | 180/68.5 |
| 7,997,367 B2* | 8/2011 | Nakamura | 180/68.5 |
| 8,042,637 B2* | 10/2011 | Nagata et al. | 180/68.5 |
| 8,187,736 B2* | 5/2012 | Park et al. | 429/62 |
| 2002/0121396 A1* | 9/2002 | Ovshinsky et al. | 180/65.3 |
| 2004/0231898 A1* | 11/2004 | Hochkoenig et al. | 180/68.1 |
| 2006/0040173 A1* | 2/2006 | Shimamura et al. | 429/99 |
| 2006/0073378 A1* | 4/2006 | Hamery et al. | 429/120 |
| 2007/0102213 A1* | 5/2007 | Seo et al. | 180/68.1 |
| 2009/0183935 A1* | 7/2009 | Tsuchiya | 180/68.1 |
| 2010/0294580 A1* | 11/2010 | Kubota et al. | 180/68.1 |

* cited by examiner

VEHICLE HAVING AN ELECTRIC DRIVE DEVICE

CROSS REFERENCE TO RELATED APPLICATION

This U.S. patent application claims priority to German Patent Application DE 10 2010007633.3, filed Feb. 5, 2010, which is incorporated by reference herein in its entirety.

FIELD OF THE INVENTION

The invention relates to a vehicle having an electric drive device and an energy storage device which is arranged in a housing and which is formed from a plurality of cells, wherein the housing comprises a plurality of partitioning devices, with the result that at least one partitioning device is positioned between two cells.

BACKGROUND OF THE INVENTION

In modern motor vehicles having at least one electric drive device, an electric energy store is usually used which comprises, for example, lithium-ion cells which are distinguished by a high energy density. The operation of such electrical energy stores should take place as far as possible in certain temperature ranges in order to ensure full efficiency and a long service life. For this reason, such energy stores must be cooled effectively in order to ensure the best possible operation and a high level of operational safety.

DE 10 2004 025 831 A1, which is incorporated by reference herein, discloses a motor vehicle having a coolable electric storage device, in which motor vehicle the energy storage device is provided with an intake air duct with an inlet opening which is provided in a region of the front end of the vehicle. In order to optimize the conduction of heat away out of the internal region of the energy storage device, the internal region is connected to an air outflow duct which is positioned in a partial vacuum region, with the result that a suction effect for assisting the conduction away of heat is made possible.

SUMMARY OF THE INVENTION

An object of the invention is to provide an improved cooling device for an electric energy store, with which cooling device improved cooling is achieved.

This object is achieved by means of a device that is described hereinafter.

The device according to aspects of the invention is distinguished by the fact that an energy storage device which is arranged in a housing is formed from a plurality of cells and that the housing comprises a plurality of partitioning devices, wherein at least one partitioning device is positioned between two cells, and wherein the housing of the energy storage device is connected both to a cooling air intake duct which has an inlet opening and to a cooling air outflow duct which has an outlet opening. In this context, at least one partitioning device is configured in such a way that a plurality of cooling ducts are formed between the cells, and cooling air can flow through said cooling ducts in order to cool the energy storage device. The partitioning device is preferably formed from at least two panels, wherein at least one web is provided between the two panels. In particular, the web is positioned between the two panels in such a way that at least one cooling duct is formed. Both the panels and the web are preferably manufactured from a material which is a good conductor of heat and/or has a low density such as, for example, aluminum or cardboard.

The device according to aspects of the invention cools the individual cells of the energy storage device from a plurality of sides. As a result, the respective cell is cooled effectively and in a targeted fashion. Each cell is surrounded by at least two partitioning devices which are provided with cooling ducts, in such a way that a plurality of cooling ducts bear virtually against the entire cell surface. Targeted conduction of heat out of the cell can be brought about in this way. Since the electrical cells expand during operation of the energy storage device, in particular during the discharging and charging processes, a partitioning device is also made available which is provided with a high degree of stability as a result of the arrangement of the webs between the two panels. Consequently, the energy storage device is embodied and accommodated within the housing in such a way that the housing is cooled in a targeted fashion and the best possible operation with a high level of operational reliability is ensured.

According to one exemplary embodiment of the invention, the web is arranged in a honeycomb shape between the panels. A web is preferably formed from a piece of sheet metal which extends between two panels in such a way that the piece of sheet metal bears alternately on each panel and is positioned inclined between the two panels. This forms an enlarged web cooling surface, which is respectively connected directly to each panel and at the same time comes into contact with the cooling air via an enlarged surface. Consequently, targeted and effective conduction of heat out of the cells can be achieved with a small cooling air stream.

According to a further exemplary embodiment of the invention, the inlet opening of the cooling air intake duct is positioned in a first vehicle region in which a higher pressure prevails than in a second vehicle region in which the outlet opening of the cooling air outflow duct opens. The first vehicle region is preferably arranged in a rear region of the vehicle, preferably in a region with increased pressure, for example an overpressure region. For example, the inlet opening is positioned in a region above the rear drive axle and/or below a trunk floor.

In particular, the second vehicle region is an under-floor region of the vehicle. As a result of the inventive positioning of the inlet opening and outlet opening, a pressure difference is generated with which a minimum cooling air stream is formed within the energy storage device. It is therefore possible to dispense with an electric air feed device, at least at certain operating points of the vehicle.

The positioning of the inlet opening of the cooling air intake duct in an internal region of the vehicle permits flexible positioning of the energy storage device within the vehicle. In particular, the inlet opening of the cooling air intake duct is positioned in the rear region of the vehicle above a rear axle. For example, the energy storage device is then arranged in a region in front of the rear drive axle, viewed in the direction of travel. Such positioning is advantageous, in particular, in sports cars since sufficient space is present between the driver's seat and the rear drive axle.

According to a further exemplary embodiment of the invention, a cooling air distributor is arranged between the energy storage device and the cooling air intake duct. The cooling air which is sucked through the cooling air intake duct can therefore be distributed uniformly among the highest possible number of cooling ducts within the energy storage device. A cooling air collector is preferably arranged between the energy storage device and the cooling air outflow duct. The positioning of the cooling air collector causes the heated cooling air to pass into a common collecting region within the cooling air collector, permitting a targeted outflow of the heated cooling air. Since the outlet opening of the cooling air outflow duct is positioned in an under-floor region of the vehicle, flexible positioning of the cooling air outflow duct is made possible. As a result, the outlet opening of the cooling air outflow duct can be positioned in an optimum way as a function of the aerodynamic conditions of the vehicle.

According to one advantageous exemplary embodiment of the invention, at least one cooling air feed device is arranged in the cooling air intake duct and/or in the cooling air distributor. Additionally or alternatively, at least one further cooling air feed device is arranged in the cooling air outflow duct and/or in the cooling air collector. As a result, when necessary, increased and strengthened cooling of the energy storage device can be performed, in particular if a high operating temperature of the energy storage device is present. The cooling air feed device is preferably formed from a plurality of fans which are positioned one next to the other in such a way that they can be activated individually. Furthermore, the cooling air feed device is positioned in such a way that a cooling air stream comes about as a result of the suction effect formed without the cooling air feed device being activated.

BRIEF DESCRIPTION OF THE DRAWINGS

Further features and combinations of features can be found in the description. Specific exemplary embodiments of the invention are illustrated in simplified form in the drawings and explained in more detail in the following description. In the drawings.

DETAILED DESCRIPTION OF THE PREFERRED EMBODIMENTS

Figure 1:
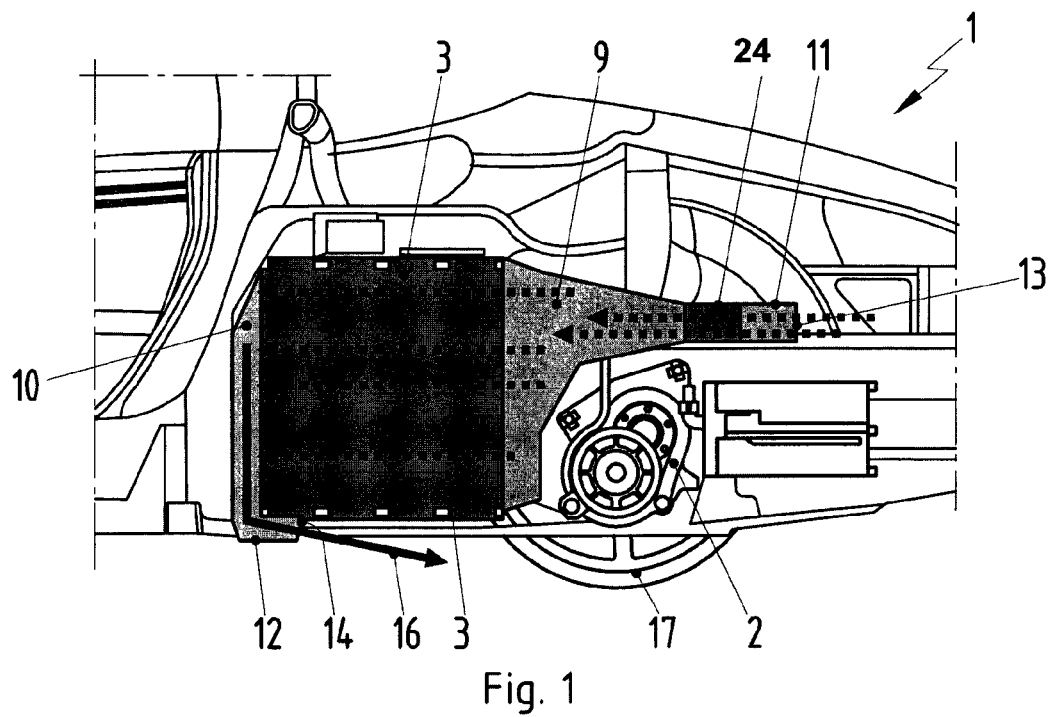
FIG. 1 is a schematic sectional illustration of a rear region of a vehicle having an electric drive device and an energy storage device arranged in a housing.

FIG. 1 illustrates a side view of a rear region of a vehicle 1. The vehicle 1 comprises at least one or two electric drive devices 2 for driving one or more vehicle axles, wherein the electric drive device 2 is preferably formed from two electric machines. The wheels 17 of the front and/or the rear vehicle axle can therefore be driven individually.

In order to supply the respective electric drive device 2 with the necessary current, an energy storage device 3 which is formed from a plurality of cells 6 is arranged in the rear region of the vehicle 1 in a housing 4. Depending on the operating strategy of the vehicle 1, the energy storage device 3 can be recharged through regeneration, for example through the feeding back of braking energy. In such a mode, the electric drive device 2 serves as a generator. Alternatively, the energy storage device 3 can be charged by means of an external power source, for example by means of a plug-in device.

Figure 3:
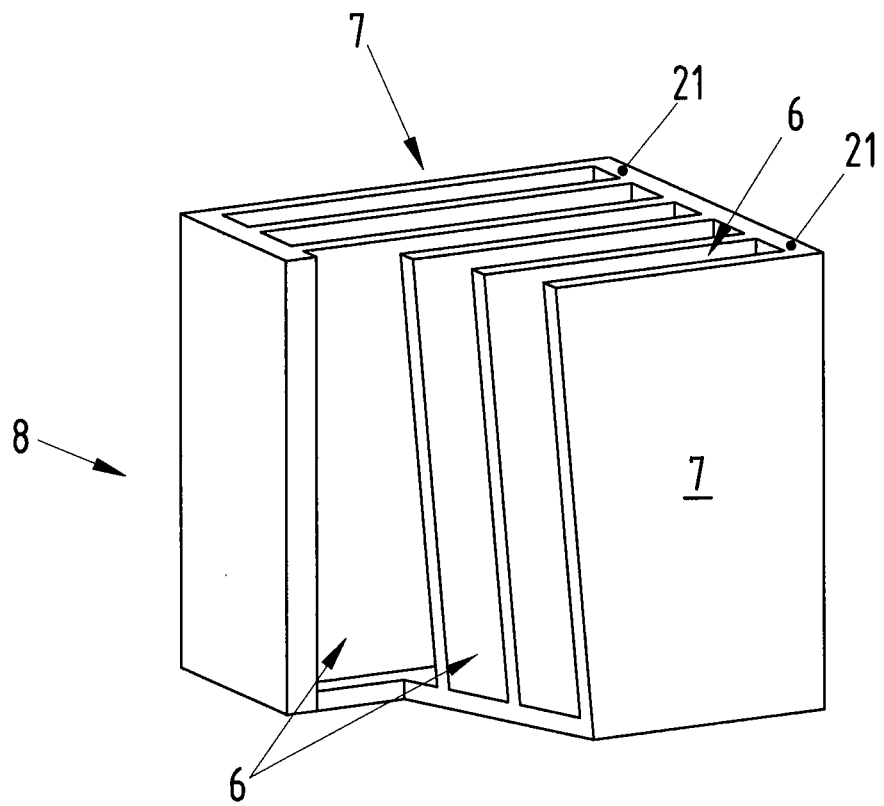
FIG. 3 is a schematic perspective sectional illustration of a module having a plurality of partitioning devices and cells of the energy storage device in FIG. 1.

In order to ensure ideal operation and a high level of operational reliability of the energy storage device 3 during operation of the vehicle, in particular on the basis of the discharging and charging of the individual cells 6, the housing 4 and the energy storage device 3 need to be connected to a cooling circuit. In order to cool the cells 6, cooling air flows through the housing 4. In order to achieve reliable cooling of the energy storage device 3, according to the invention a particular embodiment and positioning of the cells 6 are provided. For this purpose, each cell 6 is positioned individually within at least two partitioning devices 7, wherein a combination of a plurality of cells 6 in one module 8 with a plurality of partitioning devices 7 according to FIG. 3 is conceivable. Within the partitioning device 7, at least one cooling duct 20 is provided through which cooling air flows. The configuration of the energy storage device 3 from a plurality of modules 8 allows a flexible arrangement of the electric cells 6 within the housing 4, with the result that effective cooling of the individual cells 6 is ensured. According to FIG. 3, a plurality of cells 6 are arranged in the respective module 8 and positioned separated from one another by the partitioning devices 7 according to the invention. The modules 8 are arranged within the housing 4 in such a way that the flow through the cooling ducts 20 formed within the partitioning device 7 has an optimum course.

In order to permit a uniform flow of cooling air through the housing 4, a cooling air distributor 9 is attached to the housing 4, on a first side facing the rear drive axle of the vehicle 1. In this context, the cooling air distributor 9 is connected to a cooling air intake duct 11 which is provided with an inlet opening 13. The cooling air distributor 9 is preferably embodied in one piece with the cooling air intake duct 11. A cooling air collector 10, which is connected to the housing 4, is arranged on a side lying opposite the first side of the housing 4. In this context, the cooling air collector 10 is connected to a cooling air outflow duct 12 or is embodied in one piece therewith. An outlet opening 14 is positioned at the end of the cooling air outflow duct 12.

Figure 2:
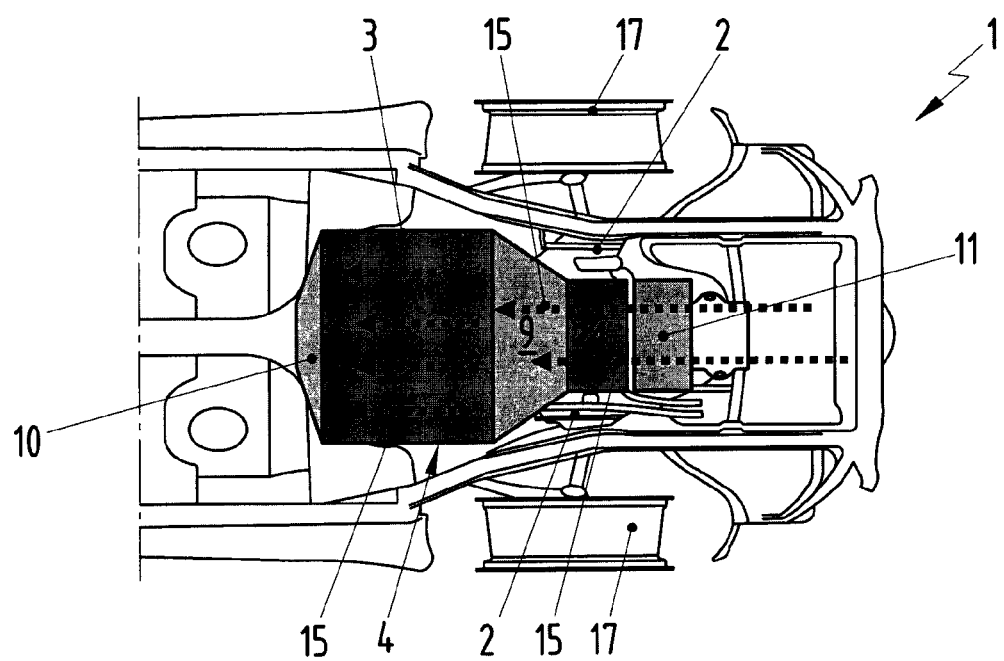
FIG. 2 is a schematic view of the vehicle in FIG. 1 from above.

According to FIGS. 1 and 2, the energy storage device 3 is positioned in a rear region of the vehicle 1, wherein the inlet opening 13 of the cooling air intake duct 11 is positioned above the rear drive axle or above the electric drive device 2. According to the invention, the inlet opening 13 is located in a rear region of the vehicle 1, preferably in a region with an increased pressure, for example in an overpressure region, in which as far as possible a higher air pressure prevails than in the region into which the outlet opening 14 opens. Here, the inlet opening 13 is positioned, for example, above the rear drive axle and/or below a floor of a trunk.

According to FIG. 1, the outlet opening 14 is positioned in an under-floor region of the vehicle 1. Consequently, cooling air is sucked into the inlet opening 13 through a suction effect which is formed. As a result, cooling air flows through the energy storage device 3 and the individual cooling ducts 20. The arrows 15 which are shown in FIGS. 1 and 2 indicate the direction of inflow air, which corresponds to the direction of travel of the vehicle. The direction of the outflow air, illustrated by arrow 16 in FIG. 1, is counter to the direction of travel of the vehicle 1. As a result, the suction effect between the inlet opening 13 and the outlet opening 14 is strengthened.

In order to ensure the operation of the energy storage device 3 with an optimum degree of efficiency, a cooling air feed device 24 is additionally provided within the cooling air distributor 9 or in the cooling air intake duct 11, said cooling air feed device 24 being composed of a plurality of fans, preferably four. Alternatively or additionally, the cooling air feed device 24 is positioned within the cooling air collector 10 or in the cooling air outflow duct 12. The fans are preferably positioned within the cooling air feed device 24 in such a way that in the switched-off operating mode of the fans a flow of cooling air through the energy storage device 3 is maintained owing to the suction effect which is formed.

Figure 4:
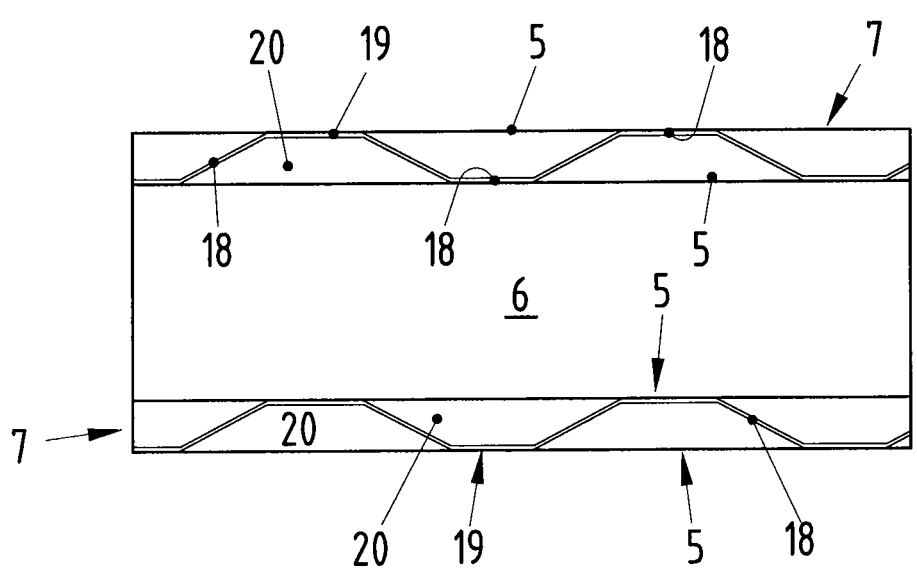
FIG. 4 is an enlarged sectional illustration of a partitioning device and cell in FIG. 3.
Figure 6:
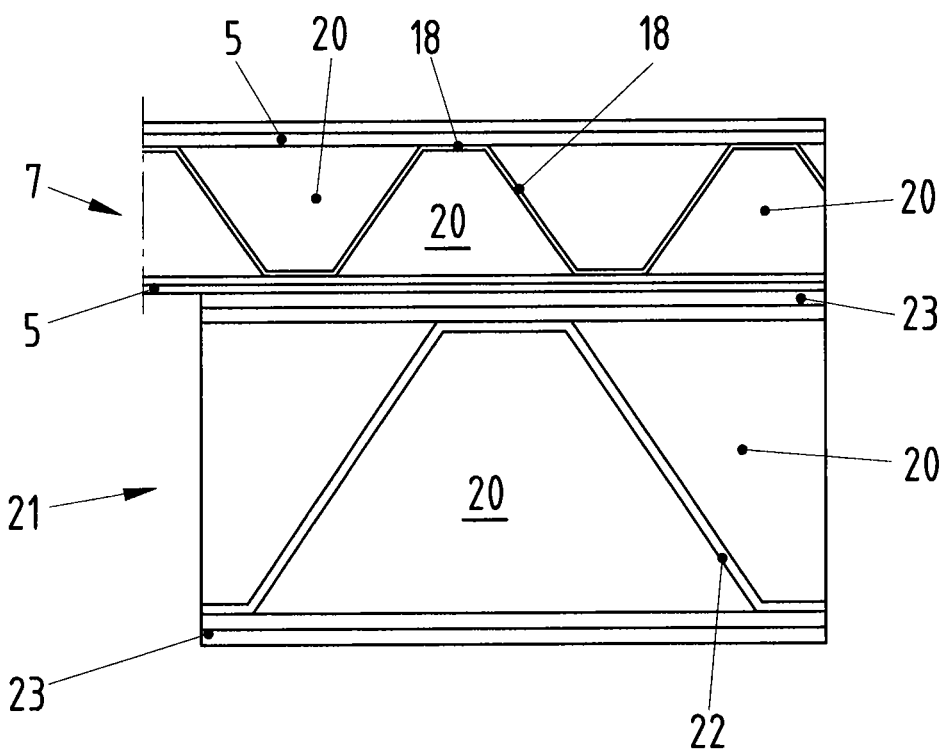
FIG. 6 is an enlarged sectional illustration of a partitioning device having a spacer element of the energy storage device in FIG. 1.

According to aspects of the invention, each electric cell 6 according to FIG. 4 is surrounded by two partitioning devices 7. Each partitioning device 7 is, according to FIG. 6, formed from at least two panels 5 which are spaced apart from one another in such a way that at least one web 18 can be positioned between the two panels 5. The panels 5 are preferably formed from a metallic material, such as aluminum, which is a good conductor of heat and has a low density. According to aspects of the invention, the web 18 is formed from a piece of sheet metal, for example from aluminum, which bears against each panel 5 of the partitioning device 7 by means of a contact surface 19 and extends diagonally between the two panels 5. The contact surface between the web 18 and the respective panel 5 is therefore made larger, with the result that the cells 6 which are positioned between the partitioning devices 7 have an enlarged contact surface both with the panel 5 and with the web 18. This gives rise to an increased heat-conducting throughflow from the heated cell 6 onto the two partitioning devices 7 which are in contact with the cell 6. This results in an optimized conduction away of heat.

Figure 5:
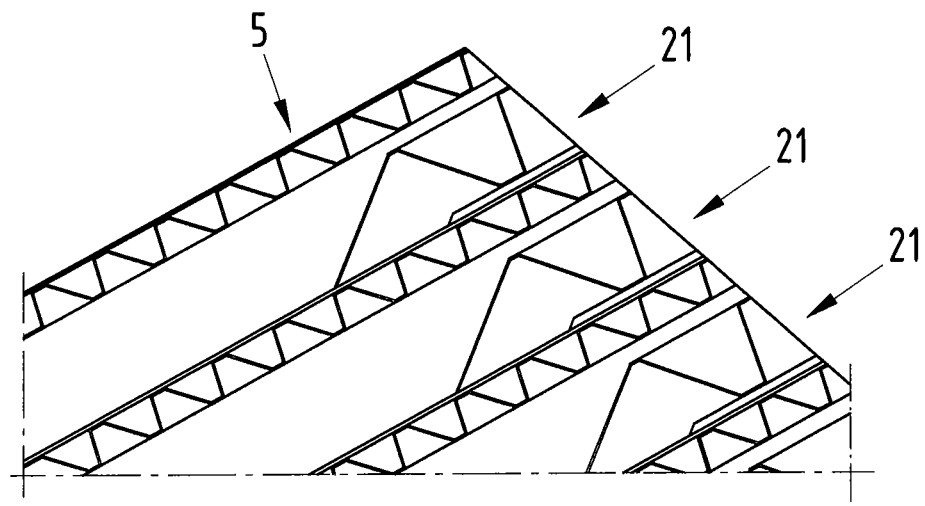
FIG. 5 is a further enlarged perspective sectional illustration of the module in FIG. 3.

A plurality of cooling ducts 20 are formed within the partitioning device 7 by virtue of the spacing apart of the two panels 5 and by virtue of the positioning of the web 18 between the two panels 5. Cooling air then flows through these cooling ducts 20 during operation of the vehicle. In order to obtain an enlarged contact surface between the web 18 and the cooling air flowing past, the web 18 is, according to aspects of the invention, arranged in a honeycomb shape between the panels 5, and in this context any other desired arrangement of the web 18 with which an enlarged contact surface is made possible is conceivable. According to FIGS. 5 and 6, the cell 6 is also surrounded laterally by a spacer element 21 which is arranged inside the partitioning device 7 and which is preferably formed from a further web 22 and two short panels 23. As a result, every partitioning device 7 or every module 8 is also provided with lateral cooling ducts. Each individual cell 6 is therefore surrounded by cooling ducts on at least four sides. This results in an enhanced conduction away of heat and leads to improved operational reliability.

The described cooling device of the energy storage device 3 is suitable, in particular, for vehicles which are operated as a hybrid vehicle or as electric vehicles. Furthermore, the present invention is suitable for vehicles having an electric drive device in which a drive device is formed from two electric motors which each drive a vehicle wheel directly. The cooling device according to the invention achieves effective cooling of the energy storage device, wherein the activation of the fans is reduced to a minimum.

The invention claimed is:

1. A vehicle having an electric drive device and an energy storage device which is arranged in a housing,
    wherein the energy storage device is formed from a plurality of cells;
    wherein the housing comprises a plurality of partitioning devices, such that at least one partitioning device is positioned between two cells;
    wherein the housing of the energy storage device is connected both to a cooling air intake duct, having an inlet opening, and to a cooling air outflow duct, having an outlet opening;
    wherein at least one partitioning device is configured in such a way that a plurality of cooling ducts are formed between the cells, and cooling air can flow through said cooling ducts in order to cool the energy storage device;
    wherein the inlet opening of the cooling air intake duct is positioned in a first region of the vehicle in which first region a higher pressure prevails than in a second region of the vehicle into which second region the outlet opening of the cooling air outflow duct opens;
    wherein the first region of the vehicle is arranged in a rear region of the vehicle, positioned above the rear drive axle and/or under the floor of the trunk; and
    wherein the second region of the vehicle is an under-floor region of the vehicle.

2. The vehicle as claimed in claim 1, wherein the partitioning device is formed from at least two panels.

3. The vehicle as claimed in claim 2, wherein at least one web is provided between the two panels, which web is positioned between the two panels in such a way that at least one cooling duct of the plurality of cooling ducts is formed.

4. The vehicle as claimed in claim 3, wherein the web is arranged in a honeycomb shape between the panels.

5. The vehicle as claimed in claim 1, wherein a cooling air distributor is arranged between the energy storage device and the cooling air intake duct.

6. The vehicle as claimed in claim 5, wherein at least one cooling air feed device is arranged in the cooling air intake duct and/or in the cooling air distributor.

7. The vehicle as claimed in claim 6, wherein the cooling air feed device is configured to be activated as a function of an operating temperature of the energy storage device.

8. The vehicle as claimed in claim 1, wherein a cooling air collector is arranged between the energy storage device and the cooling air outflow duct.

9. The vehicle as claimed in claim 8, wherein at least one cooling air feed device is arranged in the cooling air outflow duct and/or in the cooling air collector.

10. The vehicle as claimed in claim 9, wherein the cooling air feed device is configured to be activated as a function of an operating temperature of the energy storage device.

* * * * *